3,660,274
HYDROCARBON TREATING PROCESS
James J. Blazek, Reisterstown, and Richard W. Baker, Ellicott City, Md., and Charles P. Wilson, Jr., Cincinnati, Ohio, assignors to W. R. Grace & Co., New York, N.Y.
No Drawing. Continuation of application Ser. No. 686,725, Nov. 27, 1967. This application Feb. 18, 1970, Ser. No. 11,928
Int. Cl. C10g 11/04
U.S. Cl. 208—120
1 Claim

ABSTRACT OF THE DISCLOSURE

A catalytic process of upgrading hydrocarbons which is characterized by contacting the hydrocarbons under reactive conditions with a catalyst having a low surface area matrix.

---

This application is a continuation of application Ser. No. 686,725, filed Nov. 27, 1967 and now abandoned.

This invention relates to a catalytic method of upgrading hydrocarbons and more particularly to a method wherein hydrocarbons are contacted under reactive conditions with a catalyst comprising a low surface area matrix and to a method of preparing this catalyst. In a further particularly advantageous embodiment, the catalyst contains a molecular sieve aluminosilicate promoter dispersed within the low surface area matrix.

In the conventional catalytic processes of the prior art, the hydrocarbon stock to be converted is first vaporized by heating to a temperature of from 750 to 1000° F. at a pressure greater than atmospheric. The hydrocarbon vapors are then intimately contacted with a catalyst wherein conversion to the desired hydrocarbons, such as gasoline, takes place. However, simultaneously with the desired primary reaction, several complex side reactions take place, such as polymerization, or alkylation, which result in the formation of a carbonaceous deposit, commonly referred to in the art as coke. This coke forms on the surface of the catalyst restricting the pores and severely impairs the cracking efficiency of the catalyst. Thus, in order to restore the catalytic activity of the catalyst, the deposit must be removed. This is particularly critical with regard to the high activity zeolite promoted catalysts now extensively used, as essentially all, or at least a major portion, of the cracking is effected by the zeolite promoters. Since the zeolite promoter is primarily dispersed through the catalyst matrix, the coke accumulation in the pores will restrict the reactants from contacting the zeolite and eventually render the catalyst virtually ineffective.

Catalytic activity is restored by burning off the coke in a regeneration step, wherein the coke-coated catalyst is contacted at high temperature with a stream of oxidizing gas such as, for example, air. The regeneration step is normally carried out at a temperature above the cracking temperature and, as the regeneration reaction is exothermic, excess heat and localized hot spots usually develop, especially on portions of the catalyst which have accumulated an excessive coke deposit. These localized hot spots result in the fusion and collapse of the matrix pore structure thus rendering a large portion of the matrix surface area unavailable for further reactant contact. Where a promoter is used, the promoter will necessarily be entrapped within the collapsed pores and rendered unavailable for further reactive contact. Further, when a crystalline aluminosilicate promoter is used, the localized hot spots may cause destruction of said aluminosilicate crystalline structure with resulting loss of its promoter action.

In a conventional commercial cracking operation using a conventional high surface area catalyst, the catalyst comes to an equilibrium activity value within a few passes through the regeneration unit. This occurs because the amount of nonstripped hydrogen containing oil previously adsorbed by the high surface area matrices of the prior art catalysts during the reaction step remains relatively great, and the initial particle temperatures in the regenerator are high, resulting in a considerable loss of surface area and pore volume. However, as the surface area of a matrix is lowered, less oil will be adsorbed and the amount of nonstripped oil will be less, thus resulting in lower regeneration temperatures with reduced particle temperatures and, thus, less collapsing of the matrix and of the crystalline aluminosilicate promoter. Therefore, the catalyst will obtain an equilibrium value after which no substantial collapse or sintering will occur. In view of this, we concluded that if it were possible to regenerate the catalyst without the catalyst encountering excessive particle temperatures, then it would be possible to increase the number of passes required to reach equilibrium, thereby obtaining more usefulness from the promoter. We further concluded that it would be desirable to develop an equilibrium catalyst which retains a larger portion of the initial pores, thus rendering the promoter more available for catalytic contact with the hydrocarbon reactants.

We have discovered that by using a low surface area matrix, we are able to obtain higher equilibrium cracking values, especially where the catalyst contains a molecular sieve promoter. We have further found that the total surface area of the molecular sieve promoted low surface area catalyst should have a surface area, after activation by calcination at 1000° F. for 3 hours, of below 250 $m.^2/g.$ and preferably above 150 $m.^2/g.$ By using a low surface area matrix, the matrix will adsorb less hydrocarbons during the cracking portion of the reaction cycle, and thus the enusing regeneration particle temperatures will be considerably less and correspondingly there will be considerably less immediate matrix and promoter collapse. Further, as the low surface area matrix has larger pore diameters, partial collapse of the pore will restrict, to a lesser degree, the hydrocarbon molecules from contacting the promoter contained within that pore, than it would with the smaller diameter pores of the high surface area matrices of the prior art. Virtually any refractory oxide material having the necessary low surface area pore characteristics may be used as a matrix for the catalyst. Examples of such materials which exhibit a form having the necessary surface area and pore characteristics are alumina, silica-alumina, silica, silica-magnesia, silica-zirconia, clay and combinations of these materials. We have found the preferred matrix material to be a semisynthetic combination of clay and silica-alumina. The promoter may be added either during the formation of the catalyst matrix or after the catalyst has been prepared, for example, by forming a slurry of the prepared catalyst matrix and then dispersing the promoter within the slurry and then spray drying the slurry.

Normally, the promoter used in the preferred form of the low surface area matrix catalyst is a crystalline aluminosilicate zeolite, commonly known as molecular sieves. The molecular sieves used are initially alkali metal aluminosilicates, which are dehydrated forms of crystalline hydrous siliceous zeolites. However, since alkali metal ions are deleterious in cracking processes, the aluminosilicates used as the promoter will preferably have the sodium ion exchanged with some other ions such as, for example, hydrogen ion or advantageously a rare earth metal ion. The silica and alumina making up the structure of the zeolite are arranged in a definite crystalline pattern containing a large number of small uniform cavities interconnected by smaller uniform holes or channels. The effective pore size of this material is between 6 and 15 angstrom units. The catalyst molecular sieves are further characterized by the overall general formula $$xM_{2/n}:Al_2O_3:1.5-6.5SiO_2:yH_2O$$

where M is a metal cation and $n$ is its valence and $x$ varies from 0 to 1 and $y$ is a function of the degree of dehydration and varies from 0 to 9.

Several of these molecular sieve materials are suitable cracking catalysts for our process. Thus, the molecular sieves designated as zeolite X, Y and L by the Linde Division of Union Carbide Corporation, as well as the natural zeolites erionite, faujasite, chabazite, gmelinite, mordenite, etc., give satisfactory results. The most suitable forms of these zeolites for catalytic hydrocarbon treatment being synthetic faujasite (i.e., Types X and Y). In addition, the ultra stable faujasite zeolites having silica-alumina ratios of between 2 and 3 and 3 to 7, designated Z–14XS and Z–14US, respectively, by the Davison Division of W. R. Grace & Co. are also useful in this system.

The particular method of making the catalyst matrix is not a part of our invention. One advantageous method of preparing the matrix which we have found to be particularly suitable in our process is described in applications 591,420 and 591,450, both filed Nov. 11, 1966, and both now abandoned. However, other methods and catalysts may be used so long as the matrix prepared has a surface area within the desired range. A number of such methods will be illustrated by the examples.

The following examples are merely illustrative and not intended in any way to be limiting.

Also note that unless otherwise noted where a weight percent of zeolite is given, this percent is based solely on the alumina-silica content of the zeolite.

EXAMPLE I

This example illustrates the method of preparing a low surface area semisynthetic silica-alumina and clay matrix. In this example, 3,445 grams of kaolin clay were slurried with an equal weight of water and then added to 17.8 liters of neutral alum containing 95.5 grams of $Al_2O_3$ per liter. 40.3 liters of a sodium silicate solution containing 17.2 grams of $Na_2O$ per liter and 56.8 grams of $SiO_2$ per liter, at a temperature of 78° F., was added to the alum clay slurry. Gelation was observed to occur at a pH of 3.3. Additional silicate solution was continued until a total of 75.6 liters of the silicate solution had been added to the original alum clay slurry. The pH of the slurry was then increased to 5.5 by the addition of 12.9 liters of 20 percent sodium carbonate solution. The slurry was then filtered and reslurried with water and then pumped through a homogenizer. The homogenized slurry was then spray dried. The spray dried product was then given 5 washes with a 3 percent (5.5 pH) solution of ammonium sulfate at a temperature of 135° F., maintaining a weight ratio of wash to product of 5:1. The product was then given 3 washes with ammoniated distilled water (pH 9.5). The washed product was then dried in an oven at 280° F. The composition of the semisynthetic matrix produced above was: 33% clay; 48% $SiO_2$; 19% $Al_2O_3$ and minor traces of $Na_2O$ and $SiO_4$. The surface area and pore volume were determined after 3 hours calcination at 1000° F. by standard Brunauer-Emmett-Teller methods and found to be 170 m.²/g. and 0.77 cc./g., respectively.

EXAMPLE II

This example illustrates the method of preparing a low area matrix catalyst promoted with approximately 7 weight percent of a rare earth exchanged type X stabilized crystalline aluminosilicate zeolite using sodium silicate to precipitate the alumina portion of the matrix.

In this example, 3.690 grams of clay was slurried with an equal weight of water and then added to 15 liters of a neutral alum solution containing 96 grams $Al_2O_3$ per liter. 40.3 liters of sodium silicate containing 17.2 grams $Na_2O$ per liter and 56.8 grams $SiO_2$ per liter, at a temperature of 80° F., was then added to the alum clay slurry. Gelation was observed to occur at a pH of 3.3. Additional silicate solution was then added until a total of 75.6 liters had been added to the initial alum-clay slurry. The final temperature and pH of this batch was observed to be 80° F. and 3.3, respectively. The pH of the slurry was then raised to 5.5 by the addition of 15.2 liters of 15% sodium carbonate solution. 2180 grams of 43.3 percent by weight rare earth exchanged type X aluminosilicate zeolite slurry was then added to the batch slurry. The admixed slurries were then mixed by agitation and recirculation through a centrifugal pump for 15 minutes. The resulting slurry was then filtered and reslurried with deionized water and then pumped through a homogenizer operating at 2000 p.s.i.g. The homogenized slurry was then spray dried and the resulting product given 5 washes with 7.5 pH, 3 Beaumé ammonium silicate solution at 135° F. using a 5:1 weight ratio of wash liquid to product. The product was then given a further wash treatment with 3 washes of ammoniated distilled water, having a pH of 9.5, using respectively for each wash 1700 ml., 200 ml. and 100 ml. of this solution. The washed product was then dried in an oven at 280° F. The dried product was then given a further wash and ion exchange treatment to effect a further reduction in the sodium ion content, by soaking the dried product for 30 minutes in a preheated ammonium sulfate solution at a pH of 7.5, at 140° F., using a 5:1 solution to product weight ratio. After soaking, the product was filtered and then washed 3 times using ammoniated distilled water having a pH of 9. The product was then dried in an oven at 280° F. The final product was analyzed and found to contain 31.16 percent $Al_2O_3$; .055 percent $Na_2O$; 0.16 percent $SO_4$; and 2.47 percent rare earth oxide. Stoichiometrically, this product can be analyzed at approximately 33 percent clay; 45 percent $SiO_2$; 15 percent $Al_2O_3$; 7 percent rare earth exchanged type X aluminosilicate zeolite.

EXAMPLE III

This example illustrates the method of preparing the low surface area matrix catalyst promoted with 7 percent are earth exchanged type X crystalline aluminosilicate, dispersed in a semisynthetic silica-alumina (25 percent $Al_2O_3$), clay, low surface area matrix, using sodium silicate and ammonia to precipitate the alumina.

3,690 grams of clay was slurried with an equal weight of water and then added to 15 liters of a neutral alum solution containing 96 grams of $Al_2O_3$ per liter. 40.3 liters of a sodium silicate solution at 80° F. containing 17.2 grams $Na_2O$ per liter and 56.8 grams $SiO_2$ per liter was then admixed to the clay alumina slurry. Some gelation occurred. Additional sodium silicate solution was then added until a total of 75.6 liters of sodium silicate solution had been added. The pH of the resulting slurry was 3.4. The pH of the slurry was then brought to 7.8 by the addition of 5700 ml. of 20 percent ammonia solution. This was followed by the addition of 2110 grams of a rare earth exchanged type X aluminosilicate zeolite slurry having a solids content of 44.1 percent and causing the pH of the slurry to be lowered to 7.6. The pH was then adjusted back to 7.8 by the additions of 200 ml. of 20 percent ammonia solution. The addition of the first ammonia step resulted in the gelation of the alumina. The slurry was then filtered and the resulting filter cake reslurried with water. The reslurried material was then pumped through a homogenizer at 2000 p.s.i.g. and then spray dried. The spray dried product was then split in two equal parts and washed as follows:

Part I.—This portion of the spray dried product was reslurried with sufficient ammonium sulfate solution to give a reslurry having a pH of 5.5. This reslurry was then filtered and the resulting filter cake given 5 additional washes with 7.5 pH, 3° Bé. ammonia sulfate solution at a temperature of 135° F. using a 5:1 weight ratio of wash to product. The product was allowed to soak in the final wash step for 1 hour at 135° F. After the soaking, the product was filtered and then given 3 additional reslurry washes with ammoniated distilled water having a pH of 9.5. The respective quantities of wash solution used in each of these washings was respectively 1000 ml., 250 ml., and 100 ml. The product was filtered after each washing step and after the final filtration step, the product was dried in an oven at 280° F.

Part II.—The same portion of the spray dried product was washed in the same manner as the first part with the exception that no initial reslurry step was used, nor a soaking step in that the final wash was conducted using 1150 ml. of 23 percent ammonia solution, followed by a wash with 250 ml. of the same solution and then a final wash of 100 ml. The final filtered product was then dried in an oven at 180° F. The respective products of each part were then analyzed and the surface area of the respective products and pore volume determined by standard Brunauer-Emmett-Teller method after activation by 3 hours calcination at 1000° F. The results are summarized below:

TABLE I

|  | Part I | Part II |
|---|---|---|
| D.B. $Al_2O_3$ | 31.05 | 30.05 |
| D.B. $Na_2O$ | .081 | .083 |
| D.B. $SO_4$ | .21 | .30 |
| D.B. $Re_2O_3$* | 2.40 | 2.23 |
| After 3 hrs. at 1,000° F.: |  |  |
| Surface area, m.²/g | 217 | 198 |
| Pore volume, cc./g | .62 | .42 |
| Attrition | 16.6 | 12.4 |

*Rare earth metal content as the oxide.

A stoichiometric analysis of the washed product of Part II is listed below. An analysis of the product of Part I would be essentially the same as this, but would also contain a small portion of sodium ion (oxide) since the product of Part I was not subjected to the washing step.

Part II

Weight percent

Clay _____ 32
$Al_2O_3$ _____ 15
$SiO_2$ _____ 44
Rare earth exchanged type X aluminosilicate zeolite __ 9

EXAMPLE IV

The catalysts of Examples II and III were then given a simulated commercial deactivation by subjecting the catalyst to hydrothermal conditions. A conventional promoted commercial catalyst having the same chemical composition as the catalyst of Examples II and III but having a high surface area matrix was then also subjected to a simulated commercial deactivation. The hydrothermal treatment given the commercial catalyst was at a somewhat higher temperature than that given to catalysts of Examples II and III, to correspond with the higher particle temperatures encountered by this commercial catalyst during normal regenerations due to the greater amount of hydrogen-containing oils adsorbed on the surface of the conventional matrix as compared with a low surface area matrix.

EXAMPLE V

In accordance with the process of our invention, pilot plant cracking tests were run to determine the cracking characteristics of the process of our invention which uses low surface matrix catalysts as compared with a conventional process using conventional catalysts. In both instances the catalysts were first deactivated by the procedure of Example IV prior to running the test to simulate commercial operations.

In this example, a charge of a West Texas Heavy Gas Oil was charged to a fixed, fluidized-bed, pilot-plant, cracking unit utilizing the particular catalyst to be evaluated and operating the unit under identical conditions for each catalyst. In each test, the unit was operated at a temperature of 920° F., using a catalyst to oil weight ratio of 4 and a weight hourly space velocity of 10. The results of these tests and the effect of the simulated commercial deactivation on the surface area, pore volume and crystallinity of the fresh catalyst remaining after the simulated deactivation are summarized in the following table:

TABLE II

|  | Example | | Commercial catalyst |
|---|---|---|---|
| Catalyst | II | III (Part II) | |
| Fresh (3 hrs. at 1,000° F.): |  |  |  |
| Surface area, m.²/g | 153 | 198 | 341 |
| Pore volume, cc./g | 0.26 | 0.42 | 0.56 |
| After simulated commercial deactivation: |  |  |  |
| Surface area, m.²/g | 95 | 93 | 104 |
| Pore volume, cc./g | 0.24 | 0.39 | 0.36 |
| Percent of X-ray discernible crystallinity of fresh catalyst remaining | 92 | 82 | 21 |
| Conversion of feed at 25 WHSU feed rate, vol. percent | 76 | 75.5 | 59 |
| $C_5$+ gasoline, vol. percent | 65 | 68 | 53 |
| Coke, wt. percent | 4.1 | 4.2 | 3.1 |

From the above table, it may be seen that the catalyst of Examples II and III (Part II) retained a much greater percent of their fresh crystallinity after simulated deactivation than did the conventional high surface area commercial catalyst of the same chemical composition. It is further readily apparent from the cracking that the catalysts of Example II and Part II of Example III gave much higher conversions of the feed and further, of greater importance, produced a much higher conversion to the desired gasoline fraction, with only a slight increase in the amount of coke produced, as compared with the same cracking process using the conventional high surface area matrix catalyst of the same chemical composition.

Thus, our inventive method of using these catalysts as commercially hydrocarbon feeds is vastly superior to the methods of the prior art using promoted catalysts having high surface area matrixes.

Obviously, many modifications and variations of our invention may be made without departing from the scope and essence thereof and only such limitations as are recited in the appended claim should be applied.

We claim:

1. In a process for the catalytic conversion of hydrocarbons comprising contacting hydrocarbons with a fluidized faujasite promoted catalyst bed under reaction conditions, continuing said reaction until said catalyst has achieved an equilibrium state, regenerating said catalyst under oxidizing conditions to remove coke therefrom, and adding fresh make-up catalyst to said bed;

the improvement comprising:

adding a fresh make-up catalyst which comprises a fluidized non-hydrothermally deactivated faujasite promoted catalyst having an initial fresh surface area of 150 to 250 m.²/g., said initial surface area being determined after heating said catalyst at 1000° F. for about 3 hours.

References Cited

UNITED STATES PATENTS

| 3,515,683 | 6/1970 | Flank et al. | 252—455 Z |
| 3,501,418 | 3/1970 | Magee, Jr. et al. | 252—455 Z |
| 3,140,253 | 7/1964 | Plank et al. | 208—120 |

CURTIS R. DAVIS, Primary Examiner

U.S. Cl. X.R.

252—455 Z